United States Patent Office 3,468,678
Patented Sept. 23, 1969

3,468,678
ORGANIC PHOSPHORUS PRODUCTS
Rodney B. Clampitt, St. Louis, Gail H. Birum, Kirkwood, and Richard M. Anderson, St. Louis, Mo., assignors to Monsanto Company, St. Louis, Mo., a corporation of Delaware
No Drawing. Original application May 29, 1963, Ser. No. 283,964, now Patent No. 3,306,937, dated Feb. 28, 1967. Divided and this application July 22, 1966, Ser. No. 594,288
Int. Cl. C09d 5/18; C09k 3/28
U.S. Cl. 106—15                    10 Claims

ABSTRACT OF THE DISCLOSURE

A composition comprising an organic polymer and tris(bromomethyl)phosphine oxide in a flame-retardant quantity.

---

This application is a division of application Ser. No. 283,964, filed May 9, 1963, and now issued into Patent No. 3,306,937.

This invention relates to the production of organic phosphorus- and halogen-containing compounds and to organic polymer compositions containing said compounds as additives thereto.

Briefly, this invention can be described as providing tris(bromomethyl)phosphine oxide as a new compound; a general process for preparing tris(halomethyl)phosphine oxides by reacting tris(hydrocarbylcarboxymethyl)phosphine oxides with hydrogen halide; organic polymer compositions comprising a natural or synthetic polymer, or mixture thereof, and a minor amount of a tris(bromomethyl)phosphine oxide, and a method for rendering organic polymer compositions more flame resistant by incorporating into the organic polymer composition a minor amount, based on the total weight of the composition, of tris(bromomethyl)-phosphine oxide.

The compound tris(chloromethyl)phosphine oxide is known and is disclosed as having some flame-retardant activity when applied to cotton. But the flame-proofing property is lost when the treated cotton is laundered. However, until this invention no one has succeeded in preparing tris(bromomethyl)phosphine oxide. By this invention the art is provided with the new and useful compound tris(bromomethyl)phosphine oxide. By other aspects of this invention, the art is provided with a new process for making tris(halomethyl)phosphine oxides.

According to the process of this invention which is not limited to the production of tris(bromomethyl)phosphine oxide but which can be used for the preparation of tris(chloromethyl)phosphine oxide as well as phosphinylidynetrimethanol triester, i.e., a phosphorus compound of the formula $(RC(O)OCH_2)_3P{-}O$ is contacted with and allowed to react with either hydrogen bromide or hydrogen chloride. In this reaction the respective tris(bromomethyl)phosphine oxide or tris(chloromethyl)phosphine oxide is formed. A carboxylic acid is formed as a by-product. The reaction of the process can be illustrated by the following general chemical equation:

wherein R is hydrogen or hydrocarbon group, preferably having not over about 8 carbon atoms, and more preferably being an alkyl group having from 1 to 7 carbon atoms, or a monocyclic aryl group having from 6 to 7 carbon atoms, and X is bromic or chlorine.

The phosphinylidynetrimethanol tricarboxylic acid esters used as starting materials in the process of this invention may, in general be prepared by conventional methods such as by treating tris(hydroxymethyl)phosphine oxide with carboxylic acids, carboxylic acid halides, preferably the chloride or bromide, or with the carboxylic acid anhydrides. The carboxylic acids, acid halides and anhydrides used in preparing the ester starting materials of this invention are preferably those of lower molecular weight. The acids are preferably those having from 1 to about 8 carbon atoms. The acids may be aliphatic, cycloaliphatic, or aromatic. It is preferred to use the chlorides or bromides of lower alkanoic acids such as acetyl chloride, propionyl bromide, butanoyl chloride, isobutanoyl chloride, pentanoyl bromide, hexanoyl chloride, octanoyl chloride, etc., or the aromatic carboxylic acids of monocyclic aryl nature having 7 to 8 carbon atoms such as benzoyl chloride and 4-methylbenzoyl bromide.

Instead of the acid halide there may be used the carboxylic acid anhydride of the respective acids for making the tris(carboxymethyl)phosphine oxide starting materials. The preferred anhydrides are those of the lower alkanoic acids having from 1 to about 8 carbon atoms in the acid, such as acetic anhydride, formic-acetic anhydride propionic anhydride, butanoic anhydride, pentanoic anhydride, hexanoic anhydride, heptanoic anhydride and octanoic anhydride; the arylcarboxylic acid anhydrides such as the anhydrides of benzoic acid, and 2-methylbenzoic acid. Other economical acids, acid halides and acid anhydrides may be used to prepare the tris(carboxymethyl)phosphine oxides, however. The particular acid used is not critical to the invention since the acid is given off as by a by-product of the process. Choice of the acid, acid halide or acid anhydride for making the starting materials for the process of this invention is therefore dictated by the economics of the process and the relative cheapness and process-ability of the respective acid halide or acid anhydrides.

Examples of starting materials which may be used include: phosphinylidynetrimethanol triformate, triacetate, tripropionate, triisopropionate, tributanoate, triisobutanoate, trioctanoates, tribenzoate, and mixed esters such as the phosphinylidynetrimethanol formate diacetate, valerate isovalerate, acetate dibutyrate, hexanoate di-acetate, etc.

The hydrogen halide which is reacted with the phosphinylidynetrimethanol triester in the process of this invention is either hydrogen bromide or hydrogen chloride or first one of the two hydrogen halides, and then the other as desired or a mixture of the two hydrogen halides to form mixed chloromethylbromomethylphosphine oxide products. The hydrogen halide is preferably used as the substantially anhydrous gas which is passed into a phosphinylidynetrimethanol triester. However, the hydrogen halide may also be used dissolved in a suitable solvent which is mixed with the phosphinylidynetrimethanol triester. Any solvent or liquid diluent used should be one which is inert to either of the reactants or products of the reaction and which is stable at the chosen temperature of reaction. The hydrogen halide may also be dispersed in an inert gas such as nitrogen, helium, argon, etc. to closely control the rate of addition of the hydrogen halide if desired.

The hydrogen halide is usually used in a quantity sufficient to be at least stoichiometrically equivalent to the amount of the phosphinylidynetrimethanol triester used in the reaction. Depending upon the type of equipment used to conduct the reaction, the reaction may be conducted at atmospheric, sub-atmospheric, or super-atmospheric pressures. In a pressure bomb type reactor, essentially equivalent amounts of the two reactants may be used. In the preferred method of operation, however, the hydrogen halide gas is passed into the liquid phosphinylidynetrimethanol triester while stirring the mixture until no more reaction is observed. This usually involves the use of an excess amount of the hydrogen halide, say for example from 1.1 to 10.0 times the equivalent amount of hydrogen halide necessary to replace all of the hydrocarbylcarboxy groups with halogen atoms.

As stated above the hydrogen halide is preferably used as a gas which is passed into a liquid phase of the triester. The phosphinylidynetrimethanol triesters are normally solid materials at room temperature and pressure. To make them liquid it is preferred to simply heat the solid esters to melt and liquify them and then pass the gaseous hydrogen halide into the liquid melt. Alternatively the solid ester may be dissolved in a suitable inert solvent or dispersed in an inert diluent and then the hydrogen halide passed in the liquid medium.

The process of this invention may be conducted at any temperature at which the reactants can be combined in the liquid phase. However, if the phosphinylidynetrimethanol triester reactant is in the solid form dispersed in a liquid diluent the reaction usually proceeds too slowly to be of practical significance. It is preferred therefore to conduct the reaction at a temperature above the melting point of the triester and then pass the hydrogen halide into the melt. When the preferred triester of lower molecular weight as described above are used, temperatures of reaction on the order of from about 50° C. to about 200° C. are sufficient, with temperatures on the order of from about 125° C. to 175° C. being preferred for optimum results.

Instead of using the liquid melt alone as the reaction medium, it is within the scope of the process to dilute the reaction mixture with a suitable solvent or diluent. When one is used, it is preferred that it have a boiling point over 100° C. and be non-reactive with the hydrogen halide or phosphinylidynetrimethanol triester or tris(halomethyl)phosphine oxide product. A few illustrative examples of solvents are toluene, the chlorobenzenes, the xylenes, o-, m-, and p-, etc.

Contact between the hydrogen halide and the phosphinylidynetrimethanol triester may be maintained for any period of time to produce some of the desired tris-(halomethyl)phosphine oxides. The actual time of operation of the process will depend upon how the reactants are combined, the temperature of reaction, the equivalent ratios of the two reactants that are used, the nature of the specific reactants used, etc., which are readily determinable by those skilled in the art. Generally, time periods of from 1 to 10 hours are sufficient under most conditions. In the preferred method involving the passing of hydrogen halide into the melt of the ester, reaction times of from 1 to 5 hours are generally sufficient.

In the course of the reaction a carboxylic acid is produced as a by-product. This by-product may be allowed to accumulate until the reaction is completed or until equilibrium is reached and then separated from the tris-(halomethyl)phosphine oxide product by conventional techniques which include filtration, distillation, solvent extraction techniques, etc. However, the preferred procedure is to use as the starting material a phosphinylidynetrimethanol triester having a relatively low molecular weight so that during the course of the reaction the by-product carboxylic acid is volatilized or boiled off and removed from the reaction mixture at the temperature of reaction used. This method also enables driving the reaction to the efficient production of the tris(halomethyl)phosphine oxide.

When the reaction is completed after removal of most of the carboxylic acid by-product from the crude tris-(halomethyl)phosphine oxide, the product can be allowed to cool to room temperature, and purified if desired by washing with water or other medium to remove any unreacted hydrogen halide. If the product is a liquid, distillation will purify the material. A solid product can be dissolved in a suitable solvent and be recrystallized therefrom one or more times to obtain a pure product. Suitable solvents for this purpose include the lower alkanols, such as isopropanol, although there are many suitable solvents for this purpose.

The new compound, tris(bromomethyl)phosphine oxide, is useful as a flame retardant additive for natural and synthetic polymer systems. It may be used in preparing organic compositions comprising either a thermoplastic or thermo-setting polymer and a minor amount, based on the total weight of the composition, of tris (bromomethyl)-phosphine oxide. Concentrations of the compound as low as about 2%, by weight, in some polymer systems are sufficient to render the organic composition comprising the polymer and the compound at least self-extinguishing. Concentrations as low as 2.5% to 4% have been found sufficient in some polymer systems to render the composition not only self-extinguishing but non-burning, according to standard test methods. At lower concentrations, say as low as 0.5 to 1.0%, it provides many polymeric systems with reduced burning rates. For most applications concentrations of the compound below about 20% by weight are generally sufficient to render the polymer system containing it non-burning or self-extinguishing.

The present compound is a solid and it is particularly suitable for use as a flame retardant additive to thermoplastic polymer compositions. For such applications the tris(bromomethyl)phosphine oxide is merely mixed in the desired amount, together with any necessary processing aid with a solid polymer. The mixture may be mixed, e.g., by using differential speed rolls, or other rotating devices to form a homogeneous composition which is then heated and molded to the desired shape.

This compound has a surprisingly better flame retardant property as an additive to organic polymer systems containing styrene as a constituent than does tris(chloromethyl)phosphine oxide added for the same purpose. This compound has special advantages as an additive to polymer systems requiring a highly efficient additive, i.e., less than about 5% concentration, so that the heat distortion temperature of the polymer composition will not be substantially lowered. Test data have shown that tris(bromomethyl)phosphine oxide provides polymer systems derived at least in part from styrene with a combination of several advantages not obtainable with any other single additive. It provides high flame-retardant efficiency, superior thermal stability, better ultra violet light stability than other bromine-and phosphorus-containing compounds, and because of its solid nature is easily incorporated in the polymer.

This compound is found to be most effective in the following classes of polymers: the polymerized vinyl and vinylidene compounds such as polystyrene, especially foamed polystyrene, polyacrylates, polyesters, polyacrylonitrile, polyurethanes, phenolic resins and copolymers being derived at least in part from styrene, acrylic acid esters such as methyl methacrylate, maleic anhydride, acrylonitrile, polyalkylene ether glycols, phenol, etc. More particularly, the tris(bromomethyl)phosphine oxide is a useful additive to a wide variety of polymer systems for various purposes among which purposes are to reduce the burning characteristics of the resulting organic polymer compositions without substantially reducing the heat distortion temperature and to accomplish these ends with an easily processable solid additive, which tris-(bromomethyl)phosphine oxide is at normal temperatures.

A particularly preferred class of polymers enhanced by this material consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride, and 1-chloro-1-uorethylene; polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present halogenated phosphine oxide. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloracetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

The polyurethanes comprise another class of polymeric materials which are beneficially modified by tris(bromomethyl)phosphine oxide. The polyurethanes, like the above-mentioned polyesters, are commercial materials which are empolyed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and an active hydrogen compound having a molecular weight of at least 62 and up to about 5000, and having at least two reactive hydrogen atoms, i.e., hydrogen atoms determinable by the Zerewitinoff method. The useful active-hydrogen containing compounds may be di- or polyols or polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(β-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methyl-hexanol-1, p-hydroxymethylbenzylamine, etc.: and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythio-alkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400 and 600, etc., dipropylene glycol, tripropylene glycol, trithiopropylene glycol, polypropylene glycols 400, 750, 1,200 and 2,000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1-,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates or tolylene diisocyanate, p,p'-diphenylmethane diisocyanate, p-phenylene diisocyanate and 1,5-naphthalene diisocyanate, etc.

Phenolic resins are also beneficially modified by the present halogenated phosphine oxide which compound is incorporated into the resin either by milling in molding applications or by addition to film-forming or impregnating and bonding solutions previous to casting. Phenolic resins with which the present compound is employed are, for example, the phenol-aldehyde resins prepared from phenols such as phenol, cresol, xylenol, resorcinol, 4-butylphenol, 4-phenyl-phenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

Other presently employed polymers of compounds having the ethylenic group, >C—C<, are the homopolymers, copolymers and terpolymers of the olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the presently provided compound are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the tris(bromomethyl)-phosphine oxide are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylontrile copolymer, isobutylene-butadiene copolymer (butyl rubber) butadiene-styrene copolymer or 2-chlorobutadiene-vinylidene cyanide-arcylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinyl-benzene, as well as the cross linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by tris(bromomethyl)phosphine oxide to give polymeric materials of enhanced utility.

Polymeric materials with which tris(bromomethyl)-phosphine oxide can be employed as an adjuvant are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinyl-phosphine, allyl phosphite and methallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymeric materials with which this compound is very useful comprises the cellulose derviatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The compound may be incorporated into films of such cellulose derivatives by adding them to the solutions from which the films are cast or into the melts from which the fibers are extruded.

The present compound is particularly suited to the modification of liquid resin compositions of the polyester type, e.g., the linear polyesters which are obtained by the reaction of one or more polyhydric alcohols with one or more $\alpha,\beta$-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such is 3,4-dichlorostyrene, $\alpha$-chlorostyrene, $\alpha$-methylstyrene; other vinyl-substituted hydrocarbons such as $\alpha$- or $\beta$-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

When the aminoplasts are destined for use as impregnating agents, bonding adhesives, coatings and casting of films, the phosphorus compounds are incorporated into solutions or suspensions in which the aminoplast is carried. The resulting mixtures give strong, fire-retardant laminates when sheets of paper, glass cloth or fabric are impregnated therewith and cured.

Also beneficially modified by the present compound are the nylons, i.e., the superpolyamides which are generally obtained by the condensation of a diamine, e.g., hexamethylenediamine with a dicarboxylic acid, e.g., adipic acid. Depending upon the quantity of tris(bromomethyl)-phosphine oxide employed and the individual nature of the compound, there are obtained flame-retardant, dye receptor, and/or plasticizing effects.

Other polyamides with which the present phosphine oxide is beneficially employed, e.g., for improvement in reduced burning rates, are the polypeptides which may be prepared, e.g., by reaction of N-carbobenzyl oxyglycine with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present compound can be incorporated into molding or extruding compositions for plasticizing and flame-retardant effect and/or to serve as mold lubricants.

The present compound is also advantageously employed as adjuvants for polymeric aldehydes, e.g., homopolymeric, high molecular weight formaldehyde.

The present compound is also an adjuvant for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present halogenated phosphine oxide is a plasticizing flame-retardant for such self-condensation products, generally; and where transparentizing effect and dye receptivity are lacking, the present additive is often instrumental in ameliorating such deficiencies.

The present compound is likewise advantageously employed with the silicone resins, i.e., the linear polymers which have the repeating unit:

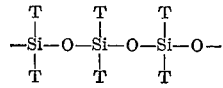

where T denotes an organic radical such as the methyl or phenyl radical, as well as the cross-linked modifications thereof, e.g., cross-linked polymeric divinyltetramethyldisiloxane.

The epoxy resins are another class of polymeric materials with which the present compound is compatible and is advantageously used. These resins are condensation products formed by the reaction of a polyhydroxy compound and epichlorohydrin, which condensation products are subsequently cured by addition of cross-linking agents. The hydroxy compound may be, e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The aminoplasts comprise another group of aldehyde resins which are beneficially modified by the present brominated phosphine oxide. Examples thereof are the heat-convertible condensation products of an aldehyde with urea, thiourea guanidine, cyanamide, dicyandiamide, alkyl or aryl guanamines, and the triazines such as melamine, 2-chloro-4,6-diamino-1-3,5-triazine and 2-hydroxy-4,6-diamino-1,3,5-triazines. The present adjuvant is compatible with the amino-plasts; and depending upon the quantity of brominated phosphine oxide used, it serves to plasticize them, and to render them fire-retardant.

Fibrous cellulosic products are prime examples of the natural polymeric materials which are advantageously modified by the present phosphine oxide. This includes products made of cotton, linen, regenerated cellulose, kapok, hemp, wood and wood pulp, etc., textiles, twines, paper, cardboard, pressed board, batting, wood flour, sawdust, etc. Another group of natural polymers of carbohydrate origin includes the starches such as those derived from corn, barley, potato and cassava. Another class of natural polymers with which the present brominated phosphine oxide is beneficially used are the natural gums, etc., agar, gum arabic, psyllium seed, tragacanth and gum karaya. Natural rubber is also included. Natural resins modified by the present phosphine oxide include shellac, copal, damar, pine balsam, rosin, etc. Proteinaceous polymeric materials, etc. animal glue, casein, wool and leather are also advantageously modified by said brominated phosphine oxides. The natural polymeric products, generally, are rendered flame-retardant when contacted with the present compounds in appropriate proportions, and worthy of special note is the glow-proofing or readily ignitible dusts and powders prepared from the natural polymers.

Various embodiments of the invention are illustrated by the following detailed examples but the invention is not limited to them.

Example 1

A 250 ml. flask equipped with a thermometer, stirrer, gas inlet tube, and still head set for downward distillation was charged with 100 g. (0.376 mole) of solid phosphinylidynetrimethanol triacetate [tris(acetoxymethyl)phosphine oxide]. The solid was melted to a liquid and heated to 160° C. while stirring. Anhydrous hydrogen bromide was passed into the liquid at 160°–170° C. After a short time, acetic acid started to distill from the reaction mixture. A total of 212 g. (2.62 moles—2.3 times the theoretical amount) of hydrogen bromide was passed into the reaction mass over a 3 hour period. After this time no more acetic acid was distilling over. When allowed to stand overnight, the reaction mixture solidified. The solid was broken up, stirred with 50 ml. of water, filtered, dried, and recrystallized from isopropanol to give 91.9 g. of crude product, M.P. 126–128° C. A second recrystallization of the product from isopropanol followed by a third recrystallization from chloroform gave 77.1 g. of colorless crystals, M.P. 128.5–129.5° C. The product, tris(bromomethyl)phosphine oxide, analyzed as containing 11.00% carbon, 1.83% hydrogen, 72.81% bromine, and 9.37% phosphorus as compared with 10.96% carbon, 1.84% hydrogen, 72.92% bromine, and 9.42% phosphorus, the calculated values. Nuclear Magnetic Resonance analysis (NMR) for phosphorus showed a single peak at —42.5 p.p.m. (relative to 85% $H_3PO_4$). The infrared spectrum showed a strong P=O band at about 1215 cm.$^{-1}$. There was no evidence of a C=O band. These data are consistent with the conclusion that the product is tris(bromomethyl)phosphine oxide.

Example 2

In a manner similar to the procedure described in Example 1, phosphinylidynetrimethanol trioctanoate [tris-(octanoylmethyl)phosphine oxide] (M.P. 37°–37.5° C.) is melted and treated with hydrogen bromide until between two and three times the stoichiometric amount of hydrogen bromide necessary to replace all of the octanoyl groups with bromine atoms has been passed into the melted ester. The by-product octanoic acid may be removed at reduced pressure.

The tris(octanoylmethyl)phosphine oxide was prepared by reacting tris(hydroxymethyl)phosphine oxide with octanoyl chloride.

Example 3

To a cylindrical reaction vessel of about 250 ml. capacity, equipped with a thermometer, a hollow disk-vane gas dispersion stirrer, and still head on a side arm of the vessel, there was added 40.5 g. (0.152 mole) of solid phosphinylidynetrimethanol triacetate [tris(acetoxymethyl)phosphine oxide]. The side arm of the vessel was wrapped with electrical heating tape. The solid was melted and heated to 175° C. with vigorous stirring. Anhydrous hydrogen chloride was passed into the liquid through the stirrer at 175°–190° C. After a short time liquid started refluxing in the side arm. The side arm was heated by the tape and acetic acid began to distill over. Hydrogen chloride addition to the reaction mixture was continued until no more distillate was obtained. A total of 117 g. (3.2 moles—7 times the theoretical quantity) of hydrogen chloride was passed in over a period of 4 hours. The mixture was stripped of volatiles to a pot temperature of 190° C. at 8 mm. The residue, a pale yellow liquid, which solidified upon cooling, weighing 29.9 g., was the crude tris(chloromethyl)phosphine oxide product (theory is 29.7 g.). The crude product would not readily re-crystallize from a benzene-hexane solvent, so after separating the solvent the residue was distilled into two fractions. A fraction containing 16.0 g. boiled at 130°–140° C./0.1 mm. This fraction solidified almost completely upon cooling. After rinsing the solid with a little benzene to remove a little oil, the solid was recrystallized twice from benzene and twice from benzenehexane to give 5.6 g. of pure tris(chloromethyl)phosphine oxide as colorless crystals, M.P. 99°–100° C. When mixed with an authentic sample of the compound prepared by another method the melting point was also 99°–100° C. It analyzed as follows:

*Analysis.*—Calcd. for $C_3H_6Cl_3OP$: C, 18.44%; H, 3.09%; Cl, 54.43%; P, 15.85%. Found: C, 18.48%; H, 3.05%; Cl, 53.93%; P, 15.76%.

The flammability test used for measuring the burn qualities of the organic compositions comprising the various polymer systems was for the most part the standard burn test known as ASTM–D635–56T with the following modifications. The polymer sample lengths were 4″ instead of the specified 5″ samples and the gage lines were placed at 1″ and 3¾″ from the one end. The hood used was completely enclosed except for the top and it is placed within a second hood which is completely closed. The exhaust of the hoods is turned off during ignition but turned on after ignition and left on during the rest of the test. This is done because of the heavy smoke and soot formed during burning.

Either of two descriptions was assigned as describing the burning quality of polymer samples which did not burn:

(1) Non-burning.
(2) Self-extinguishing.

A polymeric composition sample was considered "non-burning" (NB) if there was no evidence of burning (flame or progressive glow) beyond the first gage mark. A "self-extinguishing" (SE) sample was one that continues to burn after removal of the burner but the flame goes out before the second gage line was reached. From 3 to 7 samples of each polymer composition were tested. If the sample did not meet these requirements, it was classified as a "burning" (B) sample.

Results have shown that although it is useful as a flame-retarding additive for many polymer systems, in polystyrene, tris(bromomethyl)phosphine oxide, surprisingly, far surpassed the effectiveness of other additives as a flame retardant. Nothing yet found has compared with it for its effectiveness for this purpose and its ease of processability in polystyrene.

Example 4

This example illustrates the comparative qualities of tris(bromomethyl)phosphine oxide with other phosphorus and halogen-containing compounds as flame retardant additives in polystyrene under identical conditions.

The test procedure used for determining the relative value of the compounds as flame retardant additives was the burn test procedure ASTM D–635–56T with the following modifications:

(1) 4 inch samples were used instead of the 5 inch samples of the defined test, and the gage lines were placed at 1 inch and 3.75 inch from one end of the sample.

(2) The hood used was completely enclosed except for the top and it is placed within another hood which is completely closed. The hood exhaust was turned off during ignition but turned on after ignition and left on during the rest of the test. This is done because of the heavy smoke and soot formed during burning.

Most of the test samples of polymer compositions containing the test compounds were prepared by the extrusion method using the following procedure:

A 113 g. portion of crystal polystyrene was weighed into a 400 ml. beaker. A 113 g. portion was used because it was found that approximately 13 g. of polystyrene remains in the barrel of the extruder; this amount enables the preparation of samples containing about 100 parts of styrene. To the weighed polystyrene there was added the calculated amount of the additive needed for the desired concentration of the additive based on the total weight of the polystyrene plus additive. The additive and polystyrene were then blended with a stainless steel spatula. The resulting composition was extruded using a 1/8" die. The extruded composition was ground in an Abbe grinder, type No. 000 and extruded a second time, and re-ground to blend the composition more thoroughly and obtain more uniform samples. Then 40 g. portions of the ground blended polymer compositions containing the additive were molded into 4-inch by 4-inch by 1/8-inch sheets in a Carver press at 170° C. and 10,000 lbs. load for three minutes. These sheets are cut into 4-inch by 1/2-inch by 1/8-inch samples and used in the burn test.

Some additives which could not be extruded in polystyrene were incorporated therein by a Mill Roll method in which the polystyrene and additive were blended on hot mill rolls (approximately 200° C.).

The results of the burn test are given comparing the burn qualities of polystyrene control samples (no additive), samples containing tris(bromomethyl(phosphine oxide, and some commercially available phosphorus and halogen containing compounds.

| Additive | Percent conc., wt./wt. | Aver. Burn Time (sec.) | Burn Class | Aver., Percent Burned |
|---|---|---|---|---|
| Tris (2,3-dibromopropyl) phosphate | 2 | 37.5 | SE | 21 |
| Tris (chlorobromopropyl) phosphate | 2 | 99.4 | SE | 56 |
| Tris (bromomethyl)-phosphine oxide | 2 | 0 | NB | 0 |
| Control (no additive) | 0 | 176.4 | B | 100 |

The above burn test data are based on the burn testing of seven samples of each polymer composition.

Example 5

This example illustrates the relative effectiveness of tris(bromomethyl)phosphine oxide and tris (chloromethyl)phosphine oxide as flame retarding additives for polymer systems.

For this test crystal polystyrene compositions containing the indicated percentages of the respective additives were prepared as described in Example 4.

The results of the test burning of the respective samples were as follows:

| Additive | Percent conc., wt./wt. | Aver. Burn Time (sec.) | Burn Class | Aver., Percent Burned |
|---|---|---|---|---|
| Tris (bromomethyl)-phosphine oxide | 2 | 0 | NB | 0 |
| Tris (chloromethyl)-phosphine oxide | 5 | 273 | B | 100 |

Example 6

This example illustrates the better thermal stability of polymer compositions containing a minor amount of tris (bromomethyl)phosphine oxide as compared with polymer compositions containing minor amounts of commercially available phosphorus halogen compounds.

For this comparative test, the following procedure was used.

Into a 16 x 150 mm. test tube there was weighed 2.0 g. of low molecular weight solid polystyrene. The polystyrene was melted by placing the test tube containing it into a salt bath maintained at a designated pre-determined temperature. For these tests a temperature of 300° C. was used to provide a reasonable rate of discoloration in an efficient period of time. After the polystyrene is in the bath (completely melted at this temperature) for 3 minutes, the tube containing it was taken out of the bath and with no delay there was added 0.2 g. of the test additive (10% by weight of compound) as drops of a liquid, or as solid adhering to a stirring rod if it is as solid at room temperature. Immediately after the addition of the additive, the test tube was placed back in the bath and timing was started with a stop watch. The tube containing the test sample was removed every 1–2 minutes depending on the rate of discoloration and compared with the previously prepared color standards.

The color standards were prepared for comparing the decomposition of flame retardant additives and polystyrene as a function of time versus temperature. The standards were numbered 1 through 7.

The No. 7 standard was prepared by decomposing tris (2,3-dibromopropyl) phosphate in a high temperature bath to a dark brown almost black color.

The No. 6 standard was made by mixing 20 cc. of calcium petronate, a highly refined petroleum sulfonated with 10 cc. of o-dichlorobenzene solvent.

The No. 5 standard was made by diluting the No. 6 standard with solvent in 1:1 volume ratio.

The No. 4 standard was prepared by diluting the No. 5 standard with solvent in a volume 1:1 ratio.

The No. 3 and No. 2 standards were prepared in a similar manner by diluting the standard having the next higher number with solvent in a 1:1 volume ratio.

The No. 1 standard was prepared by diluting the No. 2 standard with solvent in a 1:3 volume ratio.

The color of the test samples were noted and the time of the notation were recorded. The tests were completed when the sample reaches a No. 7 standard.

The test results were as follows for the indicated compounds:

| Compound | Time (min.) | Color |
|---|---|---|
| Tris (2,3-dibromopropyl)-phosphate | 1 | 1 |
| | 2 | 2 |
| | 5 | 3 |
| | 5.5 | 7 |
| Tris (chlorobromopropyl)-phosphate | 2 | 3 |
| | 2.5 | Hazy |
| | 3 | 7 |
| Tris (bromomethyl)-phosphine oxide | 1 | 1 |
| | 3 | 1.5 |
| | 5 | 2.5 |
| | 9 | 3 |
| | 11 | 4 |
| | 13 | 4.5 |
| | 18 | 5 |
| | 20 | 5.5 |
| | 24 | 6 |
| | 26 | 6.5 |
| | 43 | 7 |

From the preceding table, comparison figures were calculated to show the relative efficiencies of the test compounds. The following equation was used Thermal Efficiency = 7/min. × 10 where the minutes represent the time required to reach a color of No. 7. Using this equation, the relative efficiencies can be compared on a number basis. The results are as follows for a thermal test at 300° C.

Tris(2,3-dibromopropyl)phosphate _____ 12.7
Tris(chlorobromopropyl)phosphate _____ 23.3
Tris(bromomethyl)phosphine oxide _____ 1.63 which figures indicate that tris(bromomethyl)phosphine oxide is about 8 times as thermally efficient as tris(2,3-dibromopropyl)phosphate and about 14 times as efficient as tris(chlorobromopropyl)phosphate.

Example 7

This example illustrates the stability or resistance of organic-polymer compositions containing tris(bromomethyl)phosphine oxide to ultra-violet light radiation, in comparison with the effectiveness of a commercial phosphorus and halogen compound added for the same purpose.

The following procedure was used:

A 20% by weight solution of polystyrene in toluene was first prepared by stirring 300 g. of polystyrene, portionwise, into 1200 g. of toluene. Into a glass, screw capped vial, 21 × 70 mm., 10 g. of the 20% solution of polystyrene in toluene was weighed. After noting the level of the solution, other vials of the same measurements were filled to the same level as needed for the number of additives to be tested. Then 0.2 g. of each of the respective additives was placed in vial, and stirred to uniformity. This gives a composition containing 10% of additive. If the additive was a thick liquid or a solid it was diluted to a 50% solution in toluene or even to a more dilute solution until solution was obtained. Then 0.4 g. of the additive or more as appropriate was placed in the polystyrene solution to provide 0.2 g. of additive. The resulting solutions of polystyrene plus additive were cast into films on glass slides 2 × 3 inches and 1.1 to 1.3 mm. thick using an 0.008 film caster. The samples thus obtained were placed in an exhaust oven overnight to evaporate the toluene. This leaves a thin film of polystyrene plus additive on the glass slide. Sample films which became cloudy because of slow toluene evaporation were re-cast on glass slides and placed under sun lamps for a few minutes to evaporate the toluene quickly.

The film sample slides thus obtained were placed in an ultra-violet light enclosed apparatus containing 8 ultra-violet sun lamps suspended 2″ above a turn table on which the samples were mounted. The turn table was of 24″ diameter and was rotated at 6 revolutions per minute. The heat was substantially dissipated by use of a fan and vent in the apparatus.

Before the samples were treated in the ultraviolet light apparatus the absorbance (A) of each film was determined using a light having a wave length of 420 millimicrons on a Model Cary 14 spectrophotometer. A glass slide having no film thereon was subjected to the same test to determine the absorbance thereof. The absorbance of the polystyrene plus additive film was determined by noting the difference between the slide with no film and the slide with the film. This was recorded as the initial absorbance. The samples were then placed in the ultra-violet light apparatus on the turn table. The apparatus was started and at stated time intervals (hours) the samples were tested for absorbance as before and the time was noted. When a total of 70 hours of exposure had been reached, the test was completed. A final reading of absorbance was taken and noted.

The absorbance of each sample using an ultra-violet light having a wave-length of 420 millimicrons for the indicated number of hours were as follows:

| Additive | Time (hours) | A |
| --- | --- | --- |
| Tris(2,3-dibromopropyl)phosphate | 70 | .405 |
| Tris(bromomethyl)-phosphine oxide | 70 | .265 |

The lower A is, the more transparent the film to 420 m$\mu$ light.

(A) Absorbance = $\log_{10} I./I$ where:

I. = intensity of incident light on the film alone
I = intensity of exiting light from the films alone The more transparent the film, the less the coloring of the polymer system by ultra-violet light.

Example 8

Tris(bromomethyl)phosphine oxide is useful as a flame-retardant to polyester compositions. The following exemplifies how the composition is prepared.

To 18.4 parts of a commercially available polyester copolymer prepared by condensing 2.1 moles of propylene glycol, 1 mole of phthalic anhydride, and 1 mole of maleic anhydride, processed to an acid number of about 40 at 200° C., cooled to room temperature and dissolved in styrene monomer which polymerizes with the maleic anhydride upon curing, said styrene comprising 1 part of the composition with 2 parts of the polyester, there is added 0.6 part of 50% benzoyl peroxide as catalyst, and 1.0 part of the tris(bromomethyl)phosphine oxide as additive to make 20 parts of a polyester composition containing the additive in 5% by weight concentration.

Polyester compositions containing 10% by weight and 17.5 by weight of each additive may also be prepared by admixing the ingredients in the following proportions:

| 10% Additive: | Parts |
| --- | --- |
| Polyester | 17.4 |
| Catalyst | 0.6 |
| Additive | 2.0 |
| Total | 20.0 |

| 17.5% Additive: | Parts |
| --- | --- |
| Polyester | 15.9 |
| Catalyst | 0.6 |
| Additive | 3.5 |
| Total | 20.0 |

Example 9

This example illustrates the preparation of epoxy polymeric compositions containing major proportions of polyepoxy resins and minor proportions of tris(bromoethyl)phosphine oxide.

With 3 g. of a commercially available condensation product of linoleic acid and a polyamine having an amine value of from 290–320 and a viscosity of 80–120 poises at 40° C. there is mixed 7 g. of the diglycidyl ether of Bisphenol A and a sufficient amount of tris(bromomethyl) phosphine oxide to make a composition having 10% by weight based on the weight of the total composition, of the tris(bromomethyl)phosphine oxide and the resulting reaction mixture is poured into a small aluminum pan which had been coated with a silicone grease to prevent sticking. The product is heated in an oven at 100° C. for two hours.

Example 10

Flexible polyurethane foam compositions containing various percentages of tris(bromomethyl)phosphine oxide are prepared as follows:

A first prepared mixture of 650 parts of a polyoxypropylene triol having a hydroxyl number of 56.3 (prepared from glycerin and propylene oxide), 6.5 parts of a silicone surfactant used as a foam stabilizer, 1.95 parts of stannous octoate, 3.25 parts of N-methyl morpholine, and 0.325 parts of 1-methyl-4-(dimethylaminoethyl)piperazine, as catalysts, is blended for 0.5 hour at 25° C., and divided into portions of 101.85 g.

To one portion of 101.85 g. of the above mixture there is added 9.11 g. of tris(bromomethyl)phosphine oxide 2.9 g. of water, and then, after stirring the mixture for 30 seconds, 38 g. of tolylene diisocyanate was added, and the mixture was stirred until foaming started, and then it is poured into a container lined with aluminum foil, which had been preheated to 100° C. After covering the foaming mixture, it is heated at 100° C. for 4 minutes in a forced air oven, removed from the oven, squeezed to one-half its initial thickness, and then placed in an oven at 130° C. for 1 hour. This polyurethane foam contains 6% by weight of the tris(bromomethyl)phosphine oxide.

Other polyurethane foam compositions are prepared so as to contain 8% and 10% quantities of tris(bromomethyl)phosphine oxide in a similar manner. Thus, to make a polyurethane foam composition containing 8% of the above additive, there is added 12.44 g. of the above compound to a 101.85 g. portion of the mixture; to make a foam composition containing 10% of the additive 16.00 g. of the tris(bromomethyl)phosphine oxide is used, the other ingredients of the composition remaining in the same proportions as indicated above.

Example 11

To 100 parts of a polyvinyl chloride resin there is added 50 parts of a 10:1 mixture of dioctyl phthalate and tris(bromomethyl)phosphine oxide as plasticizer/flame retardant. The combination is placed on hot mill rolls and blended. When thoroughly blended, the product is stripped from the roll and pressed into 4" by 4" by 1/16" square shaped pieces which were soft, pliable plastic. After a two week period, the sample shows no loss of the tris(bromomethyl)phosphine oxide.

Example 12

Rigid polyurethane foam compositions containing tris(bromomethyl)phosphine oxide are prepared as follows:

To a mixture of 63.4 parts of a polyoxypropylene triol having an average hydroxyl number of 379.5, 0.05 parts of stannous octoate as catalyst, from 12.6 to 16 parts of trichlorofluoromethane as blowing agent, and 0.30 part of a water soluble organo-silicone oil copolymer having a viscosity of about 900 centistokes at 25° C. and a specific gravity of 1.03 as a foam stabilizer, and 6% by weight of tris(bromomethyl)phosphine oxide, there is added 36.6 parts of tolylene diisocyanate and as foaming started the reaction mixture is poured into a kraft paper container and allowed to set until cured.

Example 13

Fire resistant polymer compositions are made by mixing samples of a commercial cellulose acetate butyrate having an average acyl content of 13.0 percent acetyl and 37 percent butyryl and a viscosity range of 17–33 seconds (64–124 poises) as determined by ASTM method D–1343–54T in the solution described as Formula A, ASTM method D–871–54T are blended on hot mill rolls and 10% of tris(bromomethyl)phosphine oxide.

Example 14

To melted samples of a natural high molecular weight low density polyethylene having a density of 0.918, a melt index of 0.3 gm./10 minutes, a softening temperature of 105°–110° C. and a tensile strength (ultimate) of 2300 p.s.i.g. there is added an amount of tris(bromomethyl)phosphine oxide sufficient to make compositions wherein the added tris(bromomethyl)phosphine oxide comprises from 4 to 8% of the total weight of the composition were added. All samples containing as little as 4% by weight of the additive are self-extinguishing according to the standard test ASTM D1692–D59T.

Example 15

To melted samples of a commercial rigid polymethylmethacrylate polymer blended on hot mill rolls there is added 10% by weight of tris(bromomethyl)phosphine oxide which is sufficient to impart flame resistant properties thereto.

Example 16

Wood, paper, and cotton are impregnated with tris(bromomethyl)phosphine oxide using the following procedure:

Using a volatile solvent, such as ethyl alcohol the tris(bromomethyl)phosphine oxide additive is dissolved in the solvent, and wood, paper, or cotton are soaked in the resulting solution. The solvent is then evaporated off leaving the additive impregnated in the wood, paper, or cotton. To obtain more rapid absorption, the wood, is soaked in the impregnating solution under vacuum.

By experimentation we found that to obtain an impregnated wood having about 7.5% by weight of additive therein, a 15% solution of the additive is needed when ethyl alcohol is used as solvent. On this basis it is then possible to obtain desired varied percentages of additive in the wood, paper, or cotton by varying the percent of additive in the impregnating solution. The solution needed to obtain a desired percentage of additive in the wood, paper, or cotton is roughly 2 times the percentage desired in the impregnated material.

The wood impregnation procedure is as follows:

Maple wood strips, 6 by 3/4 by 1/16 inches, are dried in an oven at 130° C. for at least 15 minutes and then weighed. The wood strips are then placed in test tubes containing 60 cc. of solution containing the desired percent of additive as indicated above. The test tubes containing the wood in the impregnating solution are then placed under a vacuum of 130 to 135 mm. Hg, slowly at first to prevent foaming of the impregnating solution. After 3 minutes the vacuum is relieved and the open system is allowed to stand for 1 minute after which time the wood is removed, wiped once with a paper towel and weighed. The wood strips are air dried for two minutes and then in an oven at 130° C. for 30 minutes. The percent additive in the wood was calculated as follows.

Let:

$x$ = dry weight of wood
$y$ = dry weight of wood + weight of solvent and additive picked up in impregnation
$Z$ = weight ratio of additive to solvent prepared for impregnation then $$\text{Percent additive in wood} = \frac{(y-x)Z}{x+(y-x)Z} \cdot 100$$

Wood samples containing about 7% by weight of the additive are prepared by the above procedure. Solutions of ethyl alcohol containing 15% by weight of the chemical are used to make wood samples having 7% of the added chemical.

Strips (6" by 2") of paper (Whatman filter paper No. 3) are dried in an oven at 130° C. for 10 minutes and then weighed. The weighed strips of paper are placed in glass bottles containing about 50 cc. of a solution of ethyl alcohol having about 10% or less of the tris(bromomethyl)phosphine oxide. The bottles are tilted if necessary to cover completely the paper strips with impregnating solution. After 1 minute the paper is removed, shaken to remove excess solution, and pressed between two paper tissues with a 1000 gram weight. The paper strips are weighed, and dried in air for 2 minutes and then in an oven at 130° C. for 10 minutes. It is found by experimentation that to obtain an impregnated paper having about 6% by weight of the added chemical, a solution of about 9% by weight of the chemical in the solvent was needed.

Cotton patches are impregnated in the same way as the paper samples with tris(bromomethyl)phosphine oxide. To obtain the desired percentage of additive in cotton it is found by experimentation that a 5% by weight concentration of added chemical in a ethyl alcohol solvent is needed to give a 4% by weight concentration of the chemical in cotton.

Example 17

Flame-retarding effects also are obtained when tris (bromomethyl)phosphine oxide is added to a 10% solution of a 50:50 molar ratio styrene-methyl methacrylate copolymer in benzene in an amount sufficient to be 5% by weight of the total solids content. Films are then cast from the resulting mixture.

Example 18

A copolymeric composition having improved burn resistant properties is also obtained by adding tris(bromomethyl)phosphine oxide in an amount sufficient to be 5% by weight based on the weight of the total solids content of a 10% benzene solution of a 72:28 molar ratio styrene-acrylonitrile copolymer.

Example 19

To a granular blend of a polystyrene and butadiene-styrene copolymer containing 6.5% by weight of the copolymer there is added 4% by weight of tris(bromomethyl)phosphine oxide by blending for 15 minutes in a tumbling type laboratory blender. The mixture is then extruded through a 1" single screw extruder at 400° F. into $3/16$" diameter rods.

Extruded rods of the above composition are self-extinguishing upon removal from a Bunsen burner flame in a draft free hood. A similarly extruded blend of polystyrene and butadiene-styrene copolymer containing none of the above compound continues to burn rapidly, drip flame, and emit heavy black smoke after the first ignition.

Example 20

To a 10% ethylene dichloride solution of polyvinyl acetate there is added sufficient tris(bromomethyl)phosphine oxide in a quantity which is 3% by weight to that of the polyvinyl acetate present in the solution. Films cast from the resulting mixture are flexible and show reduced burning rates.

Example 21

To a 5% solution of a polyvinyl formal in ethylene dichloride there is added tris(bromomethyl)phosphine oxide in a quantity which is 10% by weight of the total solids content of the solution. Films cast from such solution are clear and colorless after air-drying for 24 hours and when held just outside the outer cone of a Bunsen burner flame, exhibit no ignition to flame. Films of polyvinyl formal, alone that is, "controls" prepared in the absence of a phosphorus compound, burst into flame under the same circumstances.

We claim:

1. An organic composition comprising an organic polymer in contact with a flame-retarding amount, based on the weight of the total composition, of tris(bromomethyl) phosphine oxide.
2. An organic composition as described in claim 1 wherein the organic polymer is a synthetic polymer.
3. An organic composition as described in claim 2 wherein the synthetic polymer is a styrene polymer.
4. An organic composition as described in claim 3 wherein the synthetic polymer is polystyrene.
5. An organic composition as described in claim 2 wherein the synthetic polymer is an acrylate polymer.
6. An organic composition as described in claim 2 wherein the synthetic polymer is a polyester polymer.
7. An organic composition as described in claim 2 wherein the synthetic polymer is a polyolefin.
8. An organic composition as defined in claim 1 wherein the organic polymer is a natural polymer.
9. An organic composition as described in claim 8 wherein the natural polymer is derived from cotton.
10. An organic composition as described in claim 9 wherein the natural polymer is starch.

References Cited

UNITED STATES PATENTS

| 3,268,292 | 8/1966 | Chance et al. | 117—136 XR |
| 3,269,963 | 8/1966 | Ilgemann et al. | 260—45.7 XR |
| 3,341,625 | 9/1967 | Gillham et al. | 260—45.7 XR |

JULUIS FROME, Primary Examiner

L. HAYES, Assistant Examiner

U.S. C. X.R.

106—177, 210; 117—136; 252—8.1; 260—45.7, 30.6

PO-1050
(5/69)

UNITED STATES PATENT OFFICE
CERTIFICATE OF CORRECTION

Patent No. 3,468,678          Dated September 23, 1969

Inventor(s)   R. B. Clampitt et al

It is certified that error appears in the above-identified patent and that said Letters Patent are hereby corrected as shown below:

Column 1, line 17, the word "(bromomethyl)" should be -- (bromoethyl) --.

Column 1, line 55, "P—O" should be connected by a double line -- = --.

Column 1, line 69, "bromic" should be -- bromine --.

Column 2, line 31, "off as by a by-product" should be -- off as a by-product --.

Column 4, line 70, "$CH_2$—C<" should be connected by a double line -- = --.

Column 5, line 11, "1-chloro-1-uorethylene;" should be -- 1-chloro-1-fluorethylene; --.

Column 6, line 52, " >C—C< ," should be connected by a double line -- = --.

Column 6, line 53, "of the olefinic" should be -- of the α,β-olefinic --.

Column 7, line 63, "$CH_2$—C< group" should be connected by a double line -- = --.

Column 9, line 4, "-1-3,5-triazine" should be -- 1,3,5-triazine --.

Column 11, line 48, "(bromomethyl(" should be -- (bromomethyl) --.

PO-1050
(5/69)

Continued

UNITED STATES PATENT OFFICE
CERTIFICATE OF CORRECTION

Patent No. 3,468,678      Dated September 23, 1969

Inventor(s) Rodney B. Clampitt et al.      PAGE 2

It is certified that error appears in the above-identified patent and that said Letters Patent are hereby corrected as shown below:

Column 11, line 54, title of column "Buen Class" should be -- Burn Class --.

Column 12, line 29, "if it is as solid" should be -- if i is a solid --.

Column 12, line 44, "sulfonated" should be -- sulfonate -

Column 14, line 55, "ethyl)" should be -- methyl) --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents